(12) United States Patent
Pettazzi et al.

(10) Patent No.: US 6,239,812 B1
(45) Date of Patent: May 29, 2001

(54) APPARATUS AND METHOD FOR HIGH SPEED 2D/3D IMAGE TRANSFORMATION AND DISPLAY USING A PIPELINED HARDWARE

(75) Inventors: Giancarlo Pettazzi, Milan; Emilo Riva, Erba, both of (IT)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 08/598,416

(22) Filed: Feb. 8, 1996

Related U.S. Application Data

(63) Continuation of application No. 08/078,883, filed on Jun. 17, 1993, now abandoned.

(30) Foreign Application Priority Data

Jun. 29, 1992 (IT) .................................................. 92110968

(51) Int. Cl.[7] .................................................. G06F 15/00
(52) U.S. Cl. .................................................. 345/436
(58) Field of Search .................................................. 395/136, 133, 395/162, 164, 165, 166; 345/117, 433, 435, 436, 418, 419

(56) References Cited

U.S. PATENT DOCUMENTS

| | | | |
|---|---|---|---|
| 4,545,069 | 10/1985 | Kermisch | 382/46 |
| 5,097,430 | * 3/1992 | Birang | 364/572 |
| 5,157,766 | * 10/1992 | Butler et al. | 395/141 |
| 5,201,035 | * 4/1993 | Stytz et al. | 395/163 |
| 5,293,481 | * 3/1994 | Mita et al. | 395/163 |
| 5,327,527 | * 7/1994 | Hatayama | 395/133 |
| 5,404,445 | * 4/1995 | Matsumoto | 395/162 |

FOREIGN PATENT DOCUMENTS

| | | |
|---|---|---|
| 0367418 | 5/1990 | (EP) . |
| 0396517 | 11/1990 | (EP) . |
| 2244887 | 12/1991 | (GB) . |

* cited by examiner

*Primary Examiner*—Phu K. Nguyen
(74) *Attorney, Agent, or Firm*—Volel Emile; Felsman, Bradley, Vaden, Gunter & Dillon, LLP

(57) ABSTRACT

A specialized hardware engine implementing a pipeline technique allows a host graphic workstation to process and display bit mapped images in real time. This hardware engine is capable to apply a pixel by pixel transformation to a wide variety of images (e.g. monoband or three bands such as RGB with 1/2/4/8/12 bit per pixel) and displaying the resulting images that should be zoomed, shrinked, rotated, panned and moved at a high display rate. All the hardware blocks in this pipeline are fully programmable by an onboard microprocessor to allow maximum image manipulation flexibility and a wide range of image functions. Supported image functions include discrete and smooth image size magnification and reduction by bilinear interpolation, 2D/3D image transformation with perspective, image panning, scrolling and moving, color transformation by color look up table (CLUT) with support of a wide variety of pixel format images, and RGB images processing at the same speed as monoband images processing.

8 Claims, 2 Drawing Sheets

APPARATUS AND METHOD FOR HIGH SPEED 2D/3D IMAGE TRANSFORMATION AND DISPLAY USING A PIPELINED HARDWARE

This is a continuation of application Ser. No. 08/078,883, filed Jun. 17, 1993 now abandonded.

DESCRIPTION

1. Technical Field

The invention applies to the field of image processing and specifically refers to an apparatus and method for manipulating bit mapped images with a fast hardware engine capable of processing images on a pixel by pixel basis and capable of providing image 2D/3D translation, rotation, panning, zooming and shrinking at a high speed rate due to the pipelined implementation of such hardware.

This hardware engine can be suitably interfaced to a host graphic workstation bus system to give the host the capability of performing real time image transformation and display functions. It is the intent of the present invention to have the ability of processing monoband and multiband images (i.e. RGB) of any size (up to 2048×2048 pixels or larger) in a few tenths of second.

2. Background Art

It is known and usual to implement the functions provided by the present invention by software with time consuming processes.

EP-A 0367418 by J.Gonzalez-Lopez describes an hardware engine that implements an image interpolation function providing a high speed zoom capability to an image display system by using a bidimensional filter. The apparatus disclosed employs a bilinear interpolation algorithm implemented in the form of cascaded one dimensional interpolation circuits. It provides a single function of image magnification.

DISCLOSURE OF THE INVENTION

It is therefore an object of the present invention to overcome the above described drawbacks of the prior art by providing a high speed image processing system more flexible than the previous known similar systems. This capability is due to the presence of a local microprocessor capable of handling the parameters without adding any significant overhead to the hardware performances while performing the functions of image 2D/3D translation, rotation, panning, zooming and shrinking. The present hardware solution allows a significant performance improvement while adding an innovative solution. This innovative solution includes decomposing a complex image transformation into one or more simple passes with the aid of a work storage, a read path from this storage to pixel buffers, a color look-up table (CLUT) function and an averaging mechanism.

Another object of the present invention is to provide a work storage which can be smaller than the processed image, thereby saving hardware costs. To achieve this savings, the source image can be processed in several subsequent portions (called 'slices') which match the work storage size. This means that the overall passes for each image transformation must be repeated for each slice. On the other hand, the work storage size does not significantly impact the process speed and the image quality.

It is another object of this invention to provide an apparatus and method for obtaining 2D/3D image transformation functions with improved image quality.

Another object of the present invention is the possibility to "read back" a bit mapped image from the destination pixel memory to the source memory since the channel between the two memories is bidirectional.

These and other objects, as will result evident by the description, are achieved by manipulating bit mapped images on a pixel by pixel basis. This provides 2D/3D image translation, rotation, panning, zooming and shrinking through a hardware pipeline implementation and a local microprocessor. The local microprocessor controls the execution of the transformation without significantly adding any overhead to the hardware performances.

A further understanding of the nature and advantages of the present invention may be realized by reference to the remaining portions of the specification and the drawings.

BEST MODE FOR CARRYING OUT THE INVENTION

Figure 1:
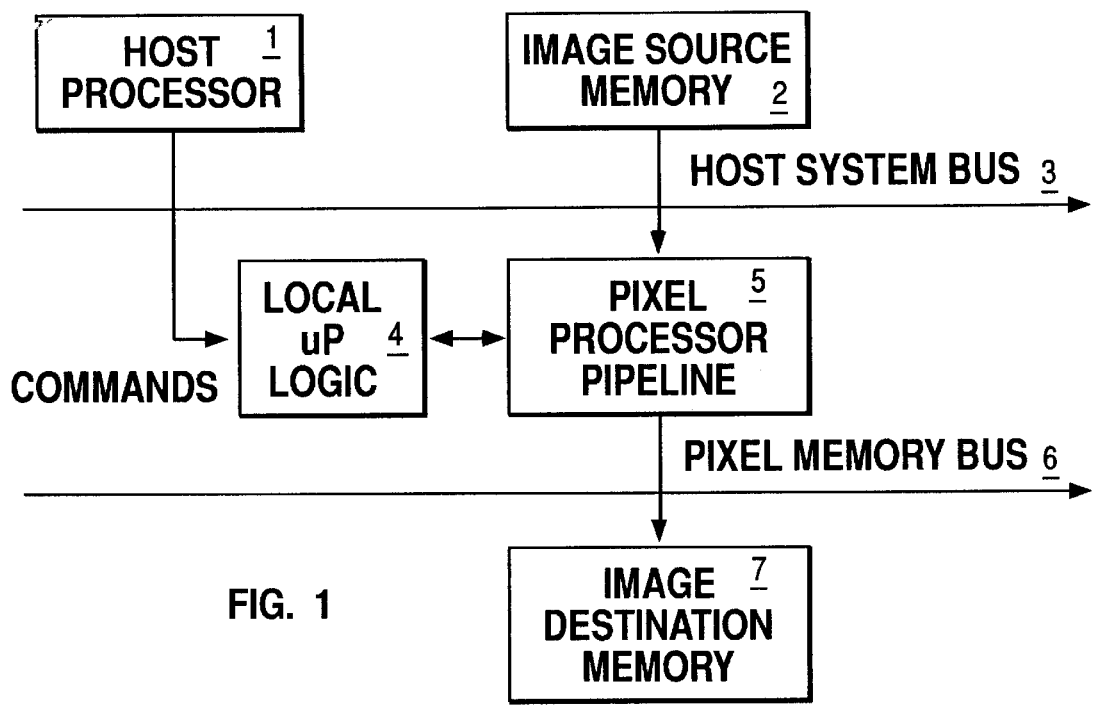
FIG. 1 illustrates how the preferred hardware should be located inside a general purpose graphic workstation architecture to add fast image processing to basic graphics functions.

The "Image Processor" architecture in FIG. 1 includes two main logic blocks, local microprocessor logic 4 and pixel processor pipeline 5. The main function of this hardware is the mapping of an image while applying a 2D/3D spatial transformation from an input window located in the image source memory 2 through a host system bus 3 and through a pixel memory bus 6 to an output viewport located in the image destination memory 7. Pixel by pixel processing is performed by the pixel processor pipeline 5 which takes advantage of the local processor power and programming capability to achieve a high degree of function flexibility with negligible software overhead. Local microprocessor logic is controlled by the host processor 1 commands.

Figure 2:
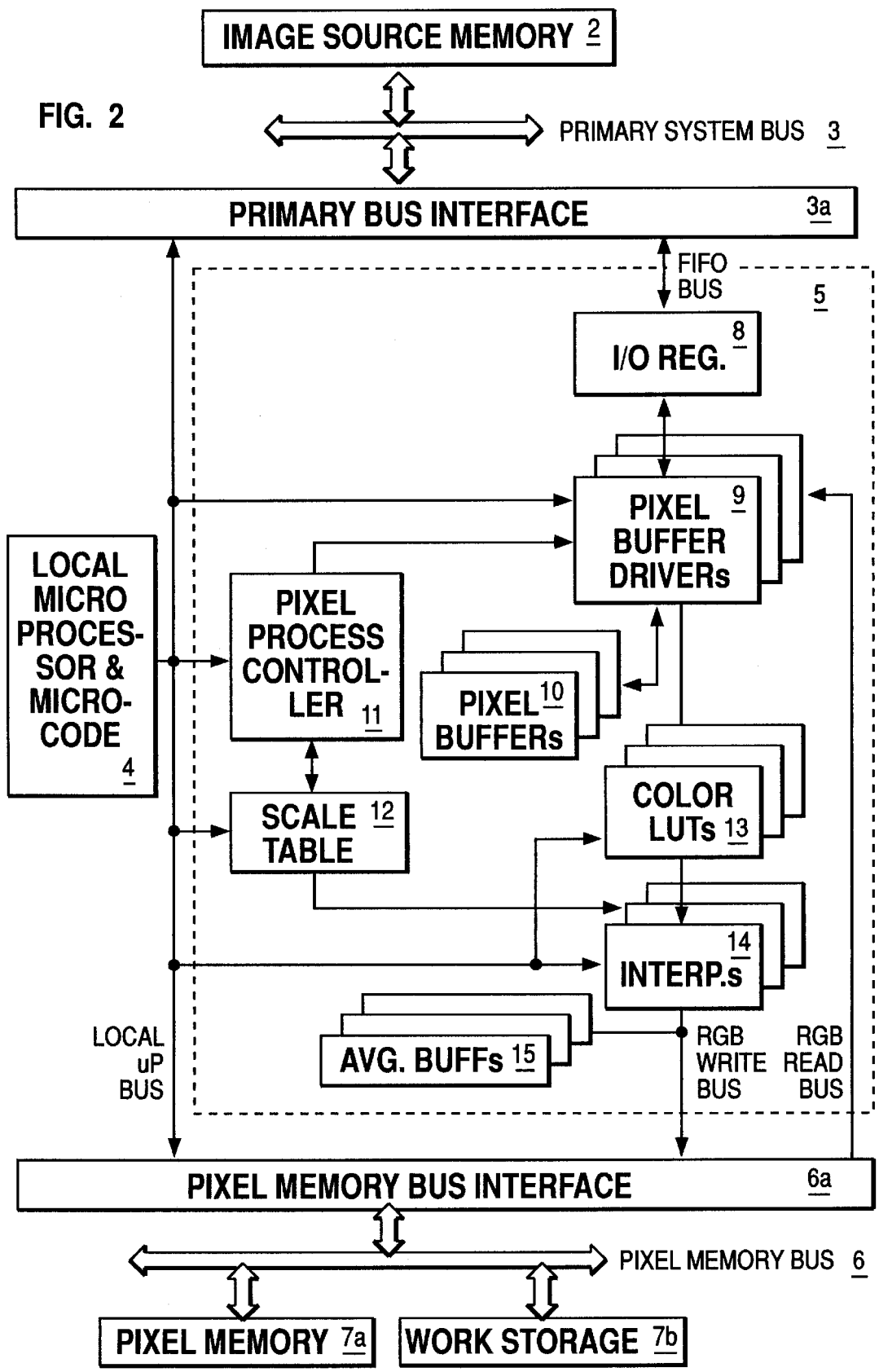
FIG. 2 illustrates a detailed hardware diagram of a preferred embodiment of the invention.

A detailed block diagram of the pixel processor pipeline 5 is shown in FIG. 2 in the dotted box. It includes the following elements.

I/O registers 8 clocks pixel data transferred from or to host bus interface 3a.

Pixel processor controller hardware 11 controls the transfer of image pixels during the pipeline process. The major tasks of this module are to provide control signals for the other elements, to compute the address of the pixels stored in pixel buffers 10 and to compute the coefficients required by interpolators 14. The calculations of the above data are based on values stored in scale table 12 and also on specific parameters for the image being processed.

Pixel buffer driver 9 controls the storage of the image rows coming from image source memory 2 into three pixel buffers 10 and their transfer to color look up tables (CLUT) RAM memory 13. The main purpose of pixel buffers 10 is to store pixels and combine the three color bands so they can be processed in parallel. The preferred sequence of pixel fetching from image source memory 2 is the first row of the first band, the first row of the second band, the first row of the third band, the second row of the first band, and so on.

Pixel buffers 10, under control of pixel buffer drivers 9, also provide the capability of resampling source image data to perform zoom and shrink functions.

CLUTs 13 provide an image color transformation function during image transfer through pixel processor pipeline 5. CLUTs are loaded with proper values for a current image function before the pipeline process begins. The number of CLUT entries to be loaded depends on the input pixel depth (1, 2, 4, 8, 12 bit/pixel). The CLUT can be loaded by local processor 4. A bit in the control register provides the capability for the processor to concurrently load three CLUTs with equal data. In this way it is possible to speed up the CLUT loading time when identity or grayscale values are requested. The CLUT can also be loaded directly from the system bus under hardware control with a significant increase in total speed and overall performance. This capability is particularly suitable when more than one image viewport is being displayed at a time and each viewport has a different CLUT.

Interpolator 14 provides continuous image zooming and shrinking in both horizontal and vertical directions concurrently. For zooming, each new pixel is computed with an interpolation function (or replication function) between contiguous pixels in both X and Y directions. Selection between the 'interpolation' function or the 'pixel replication' function is made possible for both vertical and horizontal directions by means of suitable programming of interpolators 14.

Average buffers 15 are used by interpolators 14 to temporarily store the intermediate results of the averaging process activated for shrinking an image without loss of information smooth shrink. Shrinking an image by skipping some of the input pixels may give poor results due to the loss of information. The averaging function generates output pixels by averaging the pixel values using the arithmetic mean within a rectangular window of the source image. The window dimensions are defined by the shrink scale factor. The output pixel is the arithmetic mean of all the pixels included in the window.

Figure 3:
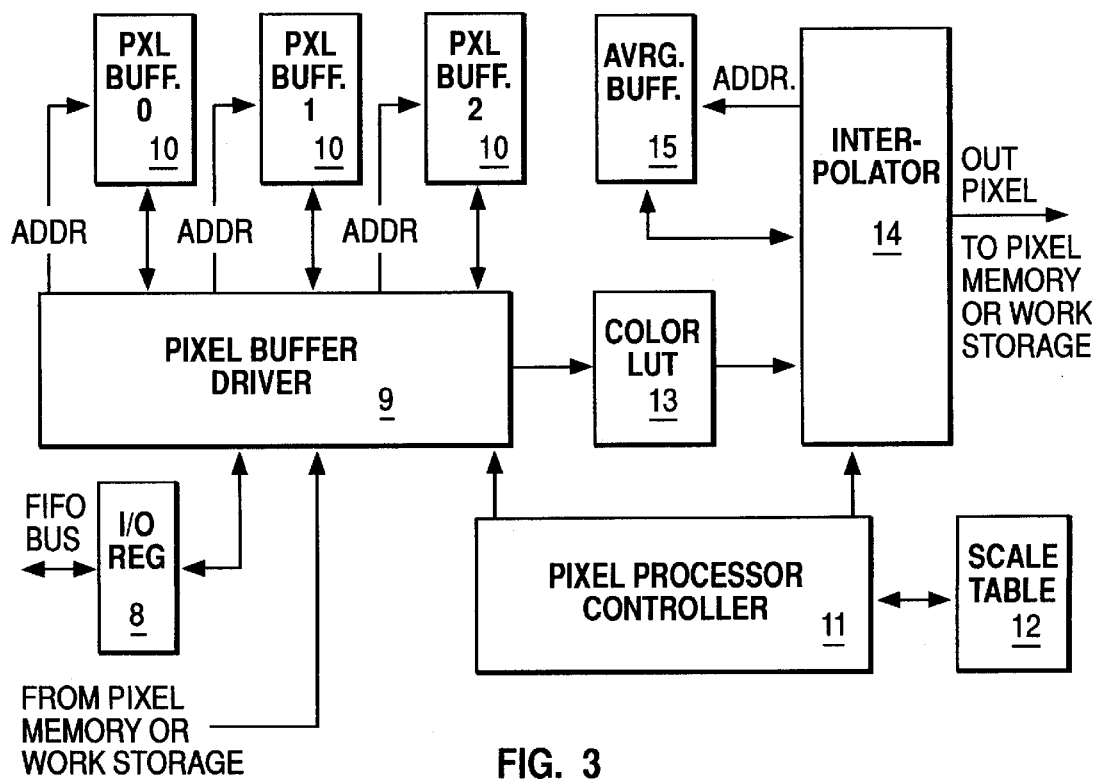
FIG. 3 illustrates one single band of the "Pixel Processor Pipeline". This single band hardware may be triplicated to allow a RGB image to be processed in the same time as a single band image.

For ease of description, the pixel processor hardware operation for a single color band will be referred to FIGS. 2 and 3. For processing RGB images, the three color bands work in parallel with the same pixel flux. In particular, FIG. 3 represents one of the three bands having the same process flux. A source image resides in a portion of the host memory called image source memory 2. Upon receiving a host command requiring an image transformation, the image source memory is accessed by local processor 4. The local processor performs the pixel fetching following procedures or rules depending upon which specific image transformation to be performed. The fetching rule should be either 'sequential row fetching' or 'equential column fetching'. The local microprocessor is in charge of starting the pixel stream transfer, but the pixels are moved by a hardware mechanism to achieve the required speed performance. Source pixels pass through host bus interface 3a, I/O registers 8 and pixel buffer driver 9 and are stored into pixel buffers 10.

The process then continues through resampling of pixels from the pixel buffers 10. This resampling is controlled by pixel processor controller 11 by means of scale table 12 data previously computed and stored by local processor 4 for the actual transformation. The resampled pixels are sent down the pipeline through CLUT 13 to interpolator 14 which generates the new pixels of the processed image.

The pixel fetching process from the source memory and the pixel line buffers resampling operations are performed simultaneously. While a new pixel row is fetched from the source memory, the previous two rows stored in the pixel line buffers are processed by the pipeline. With particular reference to FIG. 3, each single band has three pixel buffers capable of storing three image rows. This allows the mechanism described above to take place. That is, while one out of three buffers holds pixels from the current fetched row, the other two buffers hold the previous two rows which are resampled and fed down to the pipeline for processing. Two image rows are processed by the pipeline to allow a 'bilinear interpolation' to take place. Bilinear interpolation works on four pixels at a time, two belonging to a first row and the other two belonging to a second row.

The color transformation through CLUT is accomplished before the interpolation step to achieve the generation of new pixels from real color pixels instead of from indexed values.

The new generated pixels from the interpolator go to final pixel memory 7a destination area for displaying or are temporarily stored in work storage 7b for further processing according to the desired image transformation.

Pixel memory 7a and work storage 7b are accessed by pixel memory bus interface logic 6a which is able to address those memories for both write pixel and read pixel operations. These memories, such as the image source memory 2, can be read and written in sequence 'row by row' or 'column by column'. These access modes are the basic scanning mechanism required to fully support all the 2D/3D transformations.

The pipeline architecture and the availability of work storage 7b allow the performance of multiple subprocesses (called 'passes') which work on intermediate results of subsequent image transformations. The result of a previous pass is stored in work storage 7b, then is read back to the pixel line buffers and the next pass can start with a new pipeline operation with different transformation parameters. A generic complete transformation is to break down in one or more passes and the iteration of those passes is under control of local processor 4. With reference to FIG. 2, it is possible to see how each pass includes a write operation flow through RGB WRITE bus 16 and a read operation flow through RGB READ bus 17. The last pass is the final write process to destination pixel memory 7a.

Once the current transformation has been logically decomposed in a number of passes by the local processor microcode, which gets the function request from the host application, each single pass takes place through the same set of processes performed by the hardware pipeline but with a unique set of hardware programming parameters for each specific pass.

The three process steps are preferably performed by said pipeline for each pass:

1) the pixel line 'shear' operation achieved by a offset addressing of the pixel line buffer under control of pixel processor controller 11;
2) pixel line buffer 10 resampling (addressing) operation done by the pixel processor controller which computes the actual pixels addresses from scale table 12 values; and
3) the 'bilinear' interpolation operation performed by interpolator 14 which has been programmed by the local processor with the actual interpolation coefficients.

A fourth process step is the average mechanism which is activated only when the current pass needs to reduce the image size without a loss of information. This operation, called 'mooth shrink' is performed by the interpolator 14 which needs an external memory and average buffer 15 for storing the accumulated pixel values from a computed number of image source rows and columns. Those values will be averaged to generate the new final pixel.

The pixel pipeline architecture and the flexibility made available by the local processor programming, allow any image 2D/3D transformation to take place by simply iterating an adequate number of passes for each of those carried out by the same hardware process. This specific hardware achieves a high speed, limited only by the pipeline clock cycle, leading to the so called real time operation, while the total process time to get the final result depends on the number of passes required by the specific function. That is the greater is the number of passes, the longer is the process time. Herein is described a nonlimiting example of implementation as it has been developed for the IBM 6095 Graphic Processor with the IBM RISC System/6000 (trademark of IBM) Model 730 This hardware implementation has been named 'Image Display Feature (IDF)'.

A Texas Instruments TMS320C25 Digital Signal rocessor (DSP) is the local processor that is responsible for the overall control of the image display feature hardware initialization and operations. This processor supports real time digital signal processing with a fast instruction cycle time of 100 nanoseconds. The IDF microcode is loaded into the program memory during Initial Program Loading (IPL) time under the control of the host processor. Image commands and functional parameters from the host processor are stored in the host bus interface memory. The DSP uses this information for calculating values for the CLUT and for initializing the IDF hardware for the next operation. The TMS320C25 DSP generates addresses for system bus operations, controls the flow of image functions, and handles internal and external interrupts. The processor has full read and write access to all hardware registers and all onboard memory.

This IDF implementation uses a total of ten 1.5 and 2 micron CMOS gate arrays. There are two host bus interface chips, one pixel processor controller, three pixel buffer drivers, three interpolators, and one pixel memory interface.

Program and data memory are both implemented in fast access time (25 nanoseconds) CMOS Static RAM to allow zero wait state access by the DSP. The IDF has 16K×16 bits of program memory, three pixel buffers of 2K×16 bits for each single band (for total of 9 buffers 2K×16 bits for the 3 RGB bands), three CLUTs of 8K×9 bits, 3 average buffers of 2K×8 bits, and one scale table of 16K×24 bits.

Asynchronous FIFO's are used at the video pixel memory bus interface to match the IDF pipeline rate of 100 nanoseconds with the video pixel memory bus rate of 80 nanoseconds.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A single image processor apparatus for transforming an image comprising:
   a) within said single image processor, a first means for transferring image pixel data from a memory to a temporary storage a portion of image pixel data at a time;
   b) means, within said single image processor, for sampling each said temporarily stored portion of said image pixel data, wherein the first means for transferring includes transferring a portion of image pixel data while the means for sampling is concurrently sampling a previously transferred portion of image pixel data;
   c) means, within said single image processor, for concurrently spatially transforming each said sampled portion of said image pixel data in sequence while said means for sampling is sampling a subsequent portion of image gixel data; and
   d) second means, within said single image processor, for transferring each said spatially transformed portion of said image pixel data to a pixel display memory for display.

2. The single image processor apparatus of claim 1 further comprising processing means for controlling the operations of said first means for transferring, means for sampling, means for spatially transforming and second means for transferring.

3. The single image processor apparatus of claim 2 further comprising a plurality of means for sampling and a plurality of means for spatially transforming, each means for spatially transforming corresponding to a means for sampling.

4. The single image processor apparatus of claim 3 wherein each said means for spatially transforming handles a different color.

5. A single pixel processor for transforming an image comprising:
   a) processing means for processing data;
   b) memory for storing data to be processed; and
   c) means for graphically transforming an image coupled to said processing means and said memory including:
      i) first means, within said transferring means, for transferring image pixel data from the memory to a temporary storage a portion of image pixel data at a time;
      ii) means, within said transferring means, for sampling each said temporarily stored portion of said image pixel data, wherein the first means for transferring includes transferring a portion of image pixel data while the means for sampling is concurrently sampling a previously transferred portion of image pixel data;
      iii) means, within said transferring means, for concurrently spatially transforming each said sampled portion of said image pixel data in sequence while said transferring means is transferring a subsequent portion of said image pixel data; and
      iv) second means, within said transferring means, for transferring each said spatially transformed portion of said image pixel data to a pixel display memory for display.

6. The pixel processor of claim 5 wherein said means for graphically transforming further includes a local processing means for controlling the operations of said first means for transferring, means for sampling, means for spatially transforming and second means for transferring.

7. The pixel processor of claim 6 wherein said means for graphically transforming further includes a plurality of means for sampling and a plurality of means for spatially transforming, each means for spatially transforming corresponding to a means for sampling.

8. The pixel processor of claim 7 wherein each said means for spatially transforming handles a different color.

* * * * *

UNITED STATES PATENT AND TRADEMARK OFFICE
CERTIFICATE OF CORRECTION

Page 1 of 1

PATENT NO. : 6,239,812 B1
DATED : May 29, 2001
INVENTOR(S) : Pettazzi

It is certified that error appears in the above-identified patent and that said Letters Patent is hereby corrected as shown below:

Column 5,
Line 21, the word "rocessor" should be -- processor --.

Signed and Sealed this

Nineteenth Day of March, 2002

Attest:

JAMES E. ROGAN
Director of the United States Patent and Trademark Office

Attesting Officer